US012044319B2

(12) United States Patent
Jelken et al.

(10) Patent No.: US 12,044,319 B2
(45) Date of Patent: Jul. 23, 2024

(54) HIGH FLOW/LOW FLOW VALVE (71) Applicant: FISHER CONTROLS INTERNATIONAL LLC, Marshalltown, IA (US)

(72) Inventors: Shannon E. Jelken, Marshalltown, IA (US); Katherine N. Bartels, Ames, IA (US); Thomas N. Gabriel, Marshalltown, IA (US); Julian A. Mann, Ames, IA (US); Lawrence Martin, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 44 days.

(21) Appl. No.: 17/527,392

(22) Filed: Nov. 16, 2021

(65) Prior Publication Data

US 2023/0151890 A1 May 18, 2023

(51) Int. Cl.
*F16K 1/52* (2006.01)
*F16K 1/44* (2006.01)

(52) U.S. Cl.
CPC ............. *F16K 1/526* (2013.01); *F16K 1/44* (2013.01)

(58) Field of Classification Search
CPC . F16K 1/44; F16K 1/52; F16K 27/003; F16K 11/10; F16K 11/044; F16K 1/526; F16K 27/02; F16K 27/0254; F16K 1/00; F16K 1/32; F16K 11/048; F16K 11/20; F16K 11/207; Y10T 137/2562; Y10T 137/86718; F15B 2211/4053; F15B 2211/40523

USPC ......... 137/601.18, 599.09, 861, 883, 625.33, 137/625.37, 625.39, 625.29, 625.28, 112, 137/630.17, 559.06, 599.01, 599.11
See application file for complete search history.

(56) References Cited

U.S. PATENT DOCUMENTS

| 219,625 A | 9/1879 | Dickey |
| 220,202 A | 9/1879 | Wilder |
| 251,035 A | 12/1881 | Freeman |
| 324,762 A | 8/1885 | Fleischer et al. |
| 384,883 A | 6/1888 | Williams |
| 417,136 A | 12/1889 | Bell |

(Continued)

OTHER PUBLICATIONS

Search Report for International application No. PCT/US2015/022873, mailed Jun. 10, 2015.

(Continued)

*Primary Examiner* — Craig M Schneider
*Assistant Examiner* — Andrew J Rost
(74) *Attorney, Agent, or Firm* — MARSHALL, GERSTEIN & BORUN LLP (57) ABSTRACT

A high flow/low flow valve includes a valve body having a fluid inlet and a fluid outlet connected to one another by a fluid passageway. A valve seat is disposed in the fluid passageway. A low flow valve plug is disposed in the fluid passageway proximate valve seat, the low flow valve plug cooperating with the valve seat to control fluid flow through the valve seat. A high flow valve plug is disposed in the fluid passageway proximate valve seat, the high flow valve plug cooperating with the valve seat to control fluid flow through the valve seat. A low flow actuator is operatively connected to the low flow valve plug and a high flow actuator operatively connected to the high flow valve plug.

22 Claims, 2 Drawing Sheets

(56) References Cited

U.S. PATENT DOCUMENTS

| | | | |
|---|---|---|---|
| 424,199 A | 3/1890 | Haskell | |
| 609,386 A | 8/1898 | Dean | |
| 976,055 A | 11/1910 | Duham | |
| 1,567,183 A | 12/1925 | Conrader | |
| 1,586,418 A | 5/1926 | Frederiksen | |
| 1,813,222 A | 7/1931 | Barrett | |
| 1,840,564 A | 1/1932 | Brown | |
| 1,882,392 A * | 10/1932 | Musgrave | F16K 31/0679 137/614.16 |
| 2,001,534 A | 5/1935 | Hughes | |
| 2,014,968 A | 9/1935 | Hughes | |
| 2,336,653 A | 12/1943 | Taylor | |
| 2,392,741 A * | 1/1946 | Hurlburt | F16K 31/408 137/614.16 |
| 2,425,439 A | 8/1947 | Puster | |
| 2,717,005 A | 9/1955 | Bertram | |
| 2,720,892 A | 10/1955 | Mitchell | |
| 2,768,509 A | 10/1956 | Bateman | |
| 2,880,748 A | 4/1959 | Elsey | |
| 2,916,047 A | 12/1959 | Butcher | |
| 2,918,087 A | 12/1959 | Curran | |
| 2,925,824 A | 2/1960 | Rockwell | |
| 2,962,039 A | 11/1960 | Shand | |
| 2,963,261 A | 12/1960 | Holl | |
| 2,984,450 A | 5/1961 | Doe | |
| 2,993,507 A | 7/1961 | Daly | |
| 3,025,873 A | 3/1962 | Ray | |
| 3,035,608 A | 5/1962 | Ray | |
| 3,153,424 A | 10/1964 | Acker | |
| 3,193,250 A | 7/1965 | Good et al. | |
| 3,453,884 A | 7/1969 | Marx | |
| 3,545,465 A | 12/1970 | Zadoo | |
| 3,583,426 A | 6/1971 | Feres | |
| 3,646,969 A | 3/1972 | Stampfli | |
| 3,680,597 A | 8/1972 | Obermaier | |
| 3,720,234 A | 3/1973 | Gorgens et al. | |
| 3,779,275 A | 12/1973 | Ley | |
| 3,799,131 A | 3/1974 | Bolton | |
| 3,821,968 A | 7/1974 | Barb | |
| 3,836,116 A | 9/1974 | Noiles | |
| 3,884,268 A | 5/1975 | Wagner | |
| 4,460,014 A | 7/1984 | Mases | |
| 4,479,670 A | 10/1984 | Gabler | |
| 4,505,292 A | 3/1985 | Osterode | |
| 4,572,239 A | 2/1986 | Koch | |
| 4,778,148 A | 10/1988 | Kruger | |
| 5,388,613 A | 2/1995 | Kruger | |
| 5,580,031 A | 12/1996 | Lorch | |
| 6,006,732 A | 12/1999 | Oleksiewicz | |
| 6,058,956 A * | 5/2000 | Baker, Jr. | F16K 37/0075 137/624.13 |
| 6,247,461 B1 | 6/2001 | Smith | |
| 6,279,552 B1 | 8/2001 | Okada | |
| 6,286,550 B1 | 9/2001 | Yamaki | |
| 6,386,234 B2 | 5/2002 | Sontag | |
| 6,928,995 B1 | 8/2005 | Hrytzak | |
| 7,373,951 B2 * | 5/2008 | Gossett | F16K 47/08 137/625.33 |
| 8,033,294 B2 * | 10/2011 | Greif | F16K 1/443 251/367 |
| 8,403,003 B2 * | 3/2013 | Micheel | F16K 25/04 137/625.33 |
| 8,997,771 B2 * | 4/2015 | Lee | H01M 8/04753 137/625.33 |
| 9,354,638 B2 | 5/2016 | Rebreanu et al. | |
| 9,518,662 B2 * | 12/2016 | Doran | F16K 1/32 |
| 9,587,764 B2 * | 3/2017 | Juhnke | F16K 3/24 |
| 9,678,514 B2 | 6/2017 | Rebreanu et al. | |
| 9,845,901 B2 * | 12/2017 | McCormick | F16K 1/54 |
| 2006/0260692 A1 | 11/2006 | Pechtold | |

OTHER PUBLICATIONS

Written Opinion for International application No. PCT/US2015/022873, mailed Jun. 10, 2015.

\* cited by examiner

HIGH FLOW/LOW FLOW VALVE

BACKGROUND

Field of the Disclosure

The disclosure relates generally to fluid control valves and more specifically to fluid control valves with a high flow control member and a low flow control member.

Related Technology

Pressure regulators and pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

One type of pressure regulating valve is the double port regulator. Double port regulators include a fluid flow path beginning at a single fluid inlet that branches into two fluid control ports. The fluid flow path typically rejoins into a single fluid exit after the two fluid control ports. Each fluid exit port has its own valve plug and valve seat. The valve plugs are joined and synchronized in operation by a single actuator. Double port regulators have the advantage of providing high flow rates. However, double port regulators suffer from the problems of requiring very tight machining tolerances to assure that both seats completely simultaneously shut off when the valve is closed. Moreover, double port regulators do not have different controls for high flow and low flow conditions.

SUMMARY OF THE DISCLOSURE

According to some aspects, a high flow/low flow valve, or a method of operating a high flow/low valve, advantageously produces multiple flow levels of operation, and thus a wide range of operational capabilities. The high flow/low flow valves and method described herein may be advantageously employed in control valves with active control from DCS systems.

In one exemplary arrangement, a high flow/low flow valve includes a valve body having a fluid inlet and a fluid outlet connected to one another by a fluid passageway. The fluid passageway includes a first branch and a second branch. A low flow valve seat is disposed in the fluid passageway and a high flow valve seat is disposed in the fluid passageway, the high flow valve seat being separated from the low flow valve seat. A low flow valve plug is disposed in the fluid passageway, the low flow valve plug cooperating with the low flow valve seat to control fluid flow through the low flow valve seat. A high flow valve plug is disposed in the fluid passageway, the high flow valve plug cooperating with the high flow valve seat to control fluid flow through the high flow valve seat. A low flow actuator is operatively connected to the low flow valve plug and a high flow actuator is operatively connected to the high flow valve plug.

In another exemplary arrangement, a high flow/low flow valve includes a valve body having a fluid inlet and a fluid outlet connected to one another by a fluid passageway. A valve seat is disposed in the fluid passageway. A low flow valve plug is disposed in the fluid passageway proximate the valve seat, the low flow valve plug cooperating with the valve seat to control fluid flow through the valve seat. A high flow valve plug is disposed in the fluid passageway proximate valve seat, the high flow valve plug cooperating with the valve seat to control fluid flow through the valve seat. A low flow actuator is operatively connected to the low flow valve plug and a high flow actuator operatively connected to the high flow valve plug.

In another exemplary arrangement, a high flow/low flow valve includes a valve body having a fluid inlet and a fluid outlet connected to one another by a fluid passageway. A high flow valve seat is disposed in the fluid passageway. A high flow valve plug is disposed in the fluid passageway proximate high flow valve seat, the high flow valve plug cooperating with the high flow valve seat to control fluid flow through the high valve seat. The high flow valve plug includes a hollow passageway that forms part of the fluid passageway. An opening of the hollow passageway forms a low flow valve seat. A low flow valve plug is disposed in the fluid passageway proximate valve seat, the low flow valve plug cooperating with the low flow valve seat to control fluid flow through the hollow passageway. A low flow actuator is operatively connected to the low flow valve plug and a high flow actuator operatively connected to the high flow valve plug.

In another exemplary arrangement, a method of operating a high flow/low flow valve includes positioning a high flow valve plug relative a high flow valve seat at about 15% of the fully open travel of the high flow valve plug, moving a low flow valve plug relative to a low flow valve seat to control fluid flow through the low flow valve seat, positioning the low flow valve plug to between 80% and 100% of the fully open position of the low flow valve plug to maximize fluid flow thorough the low flow valve seat, and after positioning the low flow valve plug, moving the high flow valve plug relative to the high flow valve seat to increase overall fluid flow through the valve to greater than the maximum fluid flow through the low flow valve seat.

In another exemplary embodiment, a method of operating a high flow/low flow valve includes positioning a high flow valve plug relative to a high flow side of a valve seat produce a fluid flow through the valve seat equal to 80% or greater of a maximum fluid flow through a low flow side of the valve seat when a low flow valve plug is in a fully open position, moving the low flow valve plug relative to the low flow side valve seat to control fluid flow through the valve seat, positioning the low flow valve plug to 80% or greater of the fully open position to maximize fluid flow thorough the valve seat, and after the low flow valve plug is positioned, moving the high flow valve plug relative to the high flow side of the valve seat to increase overall fluid flow through the valve seat to greater than the maximum fluid flow through the low flow side of the valve seat when the low flow valve plug is in the fully open position.

In accordance with the teachings of the disclosure, any one or more of the foregoing aspects and/or exemplary aspects of a high flow/low flow valve may further include any one or more of the following optional forms.

In some optional forms, the high flow/low flow valve may include a high flow trim and a low flow trim.

In other optional forms, the high flow/low flow valve may include a high flow trim that is a different type trim than a low flow trim.

In yet other optional forms, the high flow trim comprises a clamped cage.

In yet other optional forms, the low flow trim comprises one of a skirt guided plug or a clamped cage.

In yet other optional forms, the low flow valve seat defines a low flow restriction and a maximum low flow port fluid flow, and the high flow valve seat defines a high flow restriction and a maximum high flow port fluid flow, and the maximum low flow port fluid flow is between 5% and 25%, preferably between 10% and 20%, and more preferably about 15%, of the maximum high flow port fluid flow.

In yet other optional forms, the low flow valve plug is independently positionable relative to the high flow valve plug.

BRIEF DESCRIPTION OF THE DRAWINGS

Objects, features, and advantages of the present invention will become apparent upon reading the following description in conjunction with the drawing figures, in which.

DETAILED DESCRIPTION

Certain examples are shown in the above-identified figures and described in detail below. The figures are not necessarily to scale and certain features and certain views of the figures may be shown exaggerated in scale or in schematic for clarity and/or conciseness. Additionally, any features from any exemplary embodiment may be included with, a replacement for, or otherwise combined with other features to form other embodiments.

In the embodiments described below, any feature or structure described with respect to a single embodiment in a figure may be combined and arranged with any other embodiment illustrated in any other figure, or in any non-illustrated embodiments constructed in accordance with the teachings of the disclosure.

The high flow/low flow valves described herein are well suited for use in control valves with active control from a distributed control system (DCS).

Figure 1:
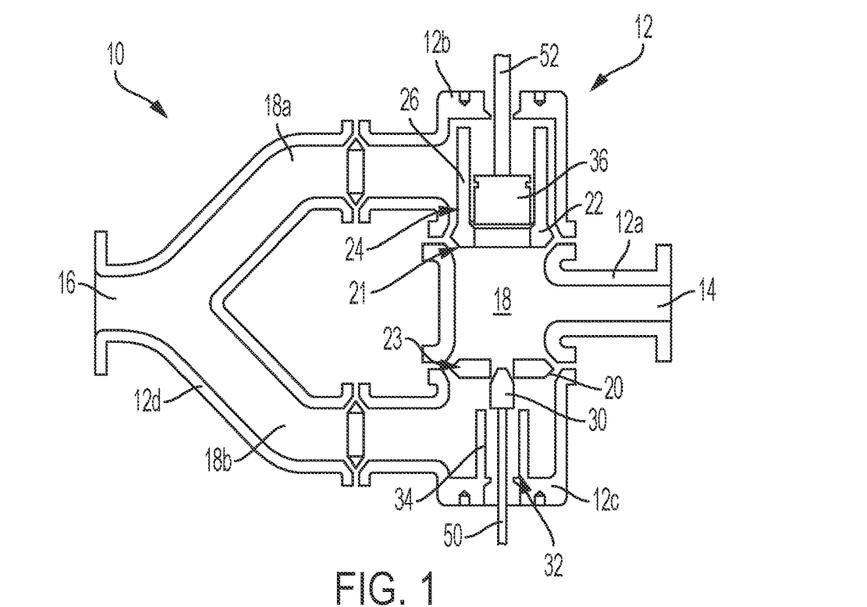
FIG. 1 is a cross-sectional view of a first embodiment high flow/low flow valve according to the disclosure.

Turning now to FIG. 1, a first embodiment of a high flow/low flow valve 10 is illustrated. The high flow/low flow valve 10 comprises a valve body 12, which may comprise multiple interchangeable segments 12a, 12b, 12c, 12d. The interchangeable segments 12a, 12b, 12c, 12d, may include outwardly curved flanges that cooperate with flanges on other segments to form a continuous valve body 12 when connected with one another, for example with brackets (not shown in FIG. 1). As a result, individual segments 12a, 12b, 12c, 12d, may be substituted or interchanged without the need for replacing the entire valve body 12.

The valve body 12 includes a fluid inlet 16 and a fluid outlet 14 connected to one another by a fluid passageway 18. In other embodiments, the fluid inlet and fluid outlet may be reversed. The fluid passageway 18 in the illustrated embodiment may include a first inlet branch 18a and a second inlet branch 18b.

A low flow valve seat 20 is disposed in a low flow port 23 of the fluid passageway 18. A high flow valve seat 22 is disposed in a high flow port 21 of the fluid passageway 18, and the high flow valve seat 22 is separated from the low flow valve seat 20 within the fluid passageway 18. In the illustrated embodiment of FIG. 1, the high flow valve seat 22 may be part of an integrated high flow trim assembly 24 that also includes a high flow clamped cage 26. In other embodiments, the high flow trim assembly 24 may include other types of cages, seat rings, plug guides, etc.

A low flow valve plug 30 is disposed in the fluid passageway 18 upstream of the low flow valve seat 20. The low flow valve plug 30 cooperates with the low flow valve seat 20 to control fluid flow through the low flow valve seat 20. A low flow trim assembly 32 may include, for example, the low flow valve seat 20 and a post guide 34. In other embodiments, other types of trim may be included in the low flow trim assembly 32. While the high flow trim assembly 24 and the low flow trim assembly 32 are illustrated in the current embodiment as being different structures, in some embodiments similar types of trim assembly structures may be employed between the high flow trim assembly 24 and the low flow trim assembly 32. For example, in some alternate embodiments, both the high flow trim assembly 24 and the low flow trim assembly 32 may comprise cages.

A high flow valve plug 36 is disposed in the fluid passageway 18 upstream of the high flow valve seat 22. The high flow valve plug 36 cooperates with the high flow valve seat 22 to control fluid flow through the high flow valve seat 22.

A low flow actuator 50 is operatively connected to the low flow valve plug 30, the low flow actuator 50 moving the low flow valve plug 30 relative to the low flow valve seat 20 to control fluid flow through the low flow valve seat 20. The low flow actuator 50 is configured to move the low flow plug 30 independently of the high flow valve plug 36.

Similarly, a high flow actuator 52 is operatively connected to the high flow valve plug 36, the high flow actuator 52 moving the high flow valve plug 36 relative to the high flow valve seat 22 to control fluid flow through the high flow valve seat 22. The high flow actuator 52 is configured to move the high flow valve plug 36 independently of the low flow valve plug 30.

The high flow/low flow valve 10 described above may be used to control a wide range of fluid flow conditions through the valve body 12. For example, when only a relatively low flow rate is needed, and/or one which requires precise control, the low flow valve plug 30 and the low flow valve seat 20 are ideally suited for fluid control. Initially, the high flow valve plug 36 is positioned relative to the high flow valve seat 22 at between 5% and 20% of the fully open high flow valve plug 36 travel. In some embodiments, the high flow valve plug 36 is positioned relative to the high flow valve seat 22 between 5% and 15%, and more particularly about 10%, of the full high flow valve plug 36 travel. Thereafter, the low flow valve plug 30 may be moved relative to the low flow valve seat 20 to precisely control low levels of fluid flow through the low flow valve seat 20. When downstream flow requirements require near maximum flow through the low flow valve seat 20, the low flow valve plug 30 may approach a fully open position to maximize fluid flow thorough the low flow valve seat 20. As the low flow valve plug 30 approaches fully open, the high flow valve plug 36 may be moved relative to the high flow valve seat 22 to increase overall fluid flow through the valve body 12 to greater than the maximum fluid flow through the low flow valve seat 20 alone. In other embodiments, the high flow valve plug 36 begins in a closed position (preventing fluid flow through the high flow valve seat 22) and the low flow valve plug 30 controls fluid flow until downstream requirements exceed the maximum flow rate through the low flow valve seat 20, at which point the low flow valve plug 30 is positioned fully open and the high flow valve plug 36 and the high flow valve seat 22 control fluid flow above the maximum low flow rate.

In the illustrated embodiment, low flow valve seat 20 defines a low flow restriction (e.g., a maximum low flow port fluid flow) in the low flow port 23 and the high flow valve seat 22 defines a high flow restriction (e.g., a maximum high flow port fluid flow) in the high flow port 21, and the maximum low flow port fluid flow is between 5% and 25%, preferably between 10% and 20%, and more preferably about 15%, of the maximum high flow port fluid flow. The disclosed relative sizing between the maximum low flow port fluid flow and the maximum high flow port fluid flow advantageously produces a crossover band of fluid flow before the low flow port reaches 100% fluid flow and the high flow port begins opening to take over when the low flow port reaches its maximum fluid flow. This crossover band reduces chattering of the low flow valve plug 30 if a control signal cycles around the crossover band.

Figure 2:
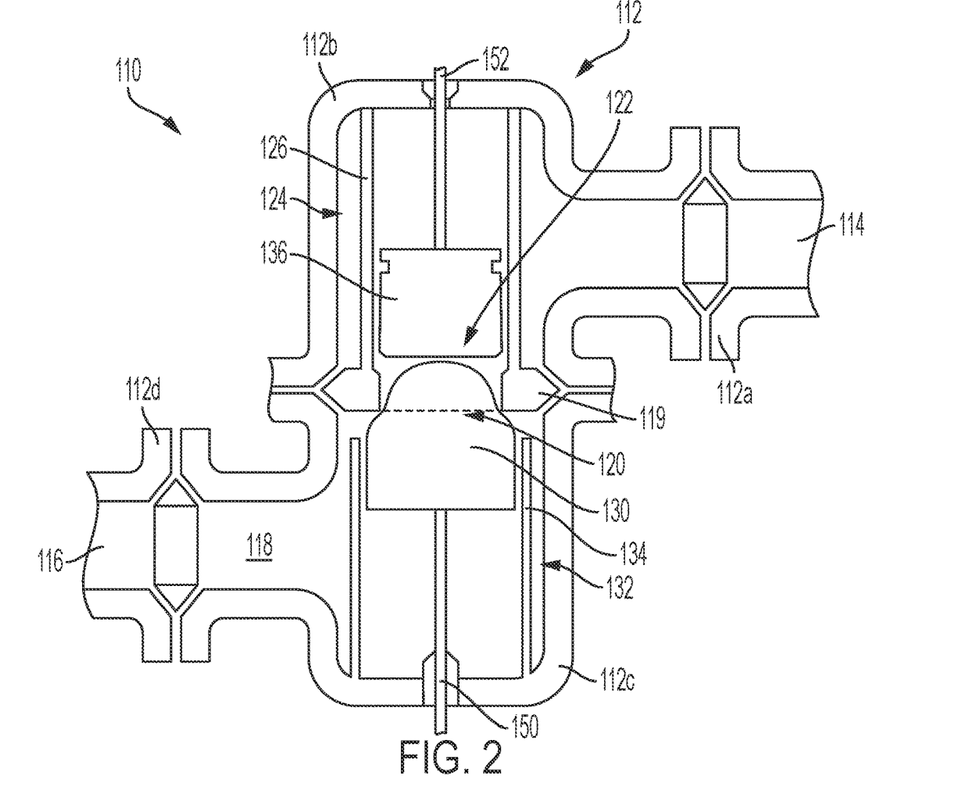
FIG. 2 is a cross-sectional view of a second embodiment of a high flow/low flow valve according to the disclosure.

Turning now to FIG. 2, a second embodiment of a high flow/low flow valve 110 is illustrated. Elements of the embodiment of FIG. 2 that correspond to identical elements in the embodiment of FIG. 1 are numbered exactly 100 greater that the embodiment of FIG. 1. For example, the valve body of FIG. 2 is numbered 112, while the valve body of FIG. 1 is numbered 12.

The high flow/low flow valve 110 illustrated in FIG. 2 includes a valve body 112 having a fluid inlet 114 and a fluid outlet 116 connected to one another by a fluid passageway 118. In other embodiments, the fluid inlet 114 and the fluid outlet 116 may be reversed. The valve body 112 may comprise multiple interchangeable segments 112a, 112b, 112c, 112d. The interchangeable segments 112a, 112b, 112c, 112d, may include outwardly curved flanges that cooperate with flanges on other segments to form a continuous valve body 112 when connected with one another, for example with brackets (not shown in FIG. 2). As a result, individual segments 112a, 112b, 112c, 112d, may be substituted or interchanged without the need for replacing the entire valve body 112. The valve body 112 includes a fluid inlet 114 and a fluid outlet 116 connected to one another by a fluid passageway 118.

A valve seat 119 is disposed in the fluid passageway 118. The valve seat 119 includes a high flow side 122 and a low flow side 120. In the illustrated embodiment of FIG. 2, the valve seat 119 may be part of an integrated high flow trim assembly 124 that also includes a high flow clamped cage 126. In other embodiments, the high flow trim assembly 124 may include other types of cages, seat rings, plug guides, etc.

A low flow valve plug 130 is disposed in the fluid passageway 118 downstream of the valve seat 120. The low flow valve plug 130 cooperates with the low flow side 120 of the valve seat 119 to control fluid flow through the valve seat 119. A low flow trim assembly 132 may include, for example, a post guide 134. In other embodiments, other types of trim may be included in the low flow trim assembly 132. While the high flow trim assembly 124 and the low flow trim assembly 132 are illustrated in the current embodiment as being different structures, in some embodiments similar types of trim assembly structures may be employed between the high flow trim assembly 124 and the low flow trim assembly 132. For example, in some alternate embodiments, both the high flow trim assembly 124 and the low flow trim assembly 132 may comprise cages.

A high flow valve plug 136 is disposed in the fluid passageway 118 upstream of the valve seat 119. The high flow valve plug 136 cooperates with the high flow side 122 of the valve seat 119 to control fluid flow through the valve seat 119.

A low flow actuator 150 is operatively connected to the low flow valve plug 130, the low flow actuator 150 moving the low flow valve plug 130 relative to the valve seat 119 to control fluid flow through the valve seat 119. The low flow actuator 150 is configured to move the low flow plug 130 independently of the high flow valve plug 136.

Similarly, a high flow actuator 152 is operatively connected to the high flow valve plug 136, the high flow actuator 152 moving the high flow valve plug 136 relative to the valve seat 119 to control fluid flow through the valve seat 119. The high flow actuator 152 is configured to move the high flow valve plug 136 independently of the low flow valve plug 130.

The high flow/low flow valve 110 described above with respect to FIG. 2, may be used to control a wide range of fluid flow conditions through the valve body 112. For example, when only a relatively low flow rate is needed, and/or one which requires precise control, the low flow valve plug 130 and the low flow side 120 of the valve seat 119 are ideally suited for fluid control. Initially, the high flow valve plug 136 is positioned away from the high flow side 122 of the valve seat 119 to a position that matches a crossover capacity of the low flow side 120, which in the illustrated embodiment is between 80% and 100% of the low flow valve plug 130 travel. This crossover capacity advantageously allows for a smooth transition between the low flow side 120 and the high flow side 122. Thereafter, the low flow valve plug 130 may be moved relative to the low flow side 120 of the valve seat 119 to precisely control low levels of fluid flow through the valve seat 119. When downstream flow requirements require more flow than the maximum flow controllable by the low flow valve plug 130, the low flow valve plug 130 approaches a fully open position to maximize fluid flow thorough the valve seat 119. Once the low flow valve plug 130 approaches the fully open position, the high flow valve plug 136 may be moved relative to the high flow side 122 of the valve seat 119 to increase overall fluid flow through the valve body 112 to greater than the maximum fluid flow controllable by the low flow valve plug 130 alone.

Figure 3:
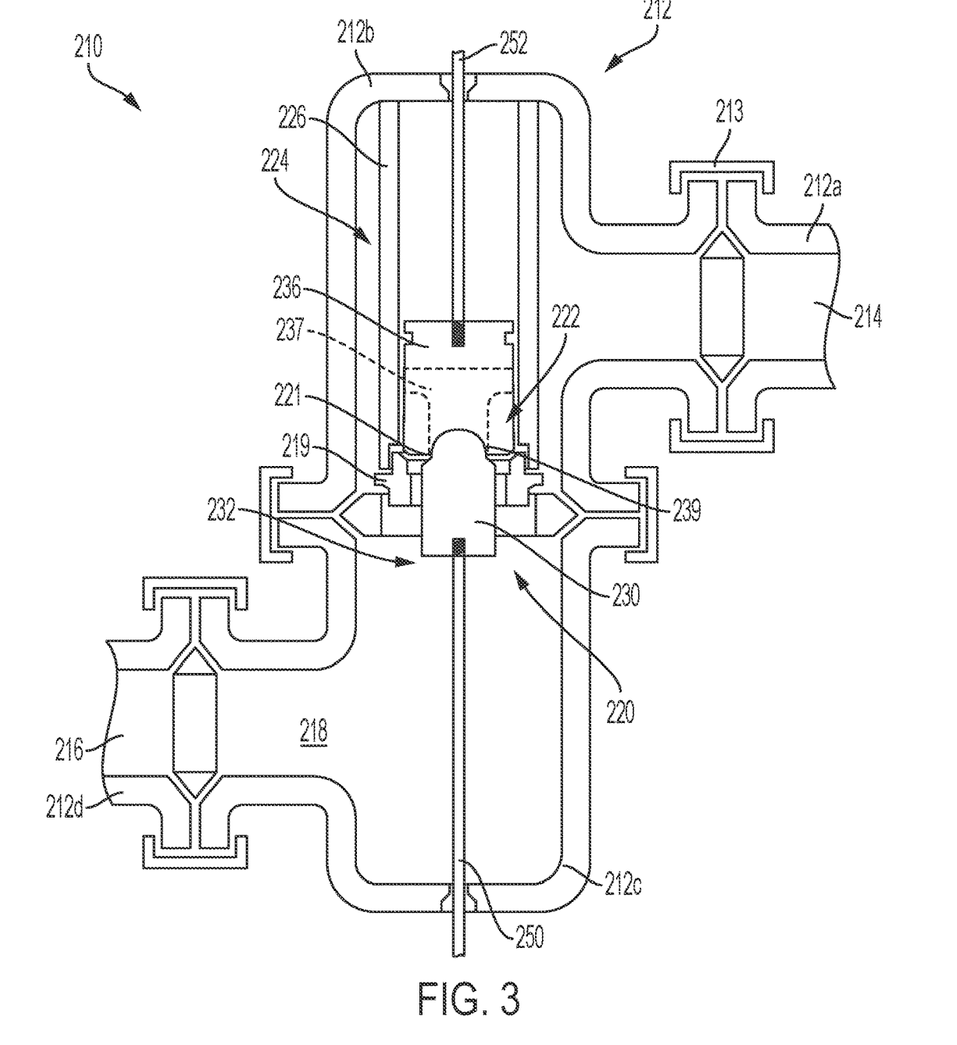
FIG. 3 is a cross-sectional view of a third embodiment of a high flow/low flow valve according to the disclosure.
Figure 4:
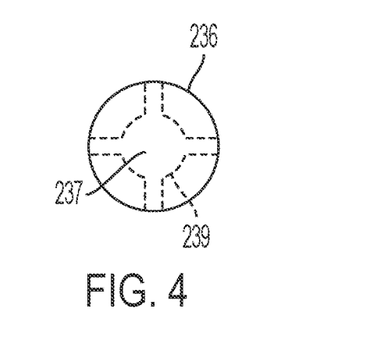
FIG. 4 is a cross-sectional view of a high flow valve plug of the high flow/low flow valve of FIG. 3.

Turning now to FIGS. 3 and 4, a third embodiment of a high flow/low flow valve 210 is illustrated. Elements of the embodiment of FIGS. 3 and 4 that correspond to identical elements in the embodiment of FIG. 1 or FIG. 2 are numbered exactly 100 or 200 greater that the embodiment of FIG. 1 or FIG. 2. For example, the valve body of FIG. 3 is numbered 212, while the valve body of FIG. 1 is numbered 12 and the valve body of FIG. 2 is numbered 112.

The high flow/low flow valve 210 comprises a valve body 212 having a fluid inlet 214 and a fluid outlet 216 connected to one another by a fluid passageway 218. In other embodiments, the fluid inlet 214 and the fluid outlet 216 may be reversed. The valve body 212 may comprise multiple interchangeable segments 212a, 212b, 212c, 212d. The interchangeable segments 212a, 212b, 212c, 212d, may include outwardly curved flanges that cooperate with flanges on other segments to form a continuous valve body 212 when connected with one another a mechanical joint retention mechanism, for example by clamps or brackets 213. As a result, individual segments 212a, 212b, 212c, 212d, may be substituted or interchanged without the need for replacing the entire valve body 212.

A valve seat 219 is disposed in the fluid passageway 218. The valve seat 219 includes a high flow side 222 and a low flow side 220. In the illustrated embodiment of FIG. 3, the valve seat 219 may be part of an integrated high flow trim assembly 224 that also includes a high flow clamped cage 226. In other embodiments, the high flow trim assembly 224 may include other types of cages, seat rings, plug guides, etc.

A high flow valve plug 236 is disposed in the fluid passageway 218 proximate valve seat 219. The high flow valve plug 236 cooperates with the high flow side 222 of the valve seat 219 to control fluid flow through the valve seat 219. The high flow valve plug 236 includes a hollow passageway 237 that forms part of the fluid passageway 218. An opening 239 of the hollow passageway 237 forms a low flow valve seat 221.

A low flow valve plug 230 is disposed in the fluid passageway 218 proximate the valve seat 219. The low flow valve plug 230 cooperates with the low flow valve seat 221 to control fluid flow through the hollow passageway 237. A low flow trim assembly 232 may include, for example, the low flow valve plug 230 and the low flow valve seat 221. In other embodiments, other types of trim may be included in the low flow trim assembly 232, such as plug guides, cages, etc. While the high flow trim assembly 224 and the low flow trim assembly 232 are illustrated in the current embodiment as being different structures, in some embodiments similar types of trim assembly structures may be employed between the high flow trim assembly 224 and the low flow trim assembly 232. For example, in some alternate embodiments, both the high flow trim assembly 224 and the low flow trim assembly 232 may comprise cages.

A low flow actuator 250 is operatively connected to the low flow valve plug 230, the low flow actuator 250 moving the low flow valve plug 230 relative to the low flow valve seat 239 to control fluid flow through the low flow valve seat 239. The low flow actuator 250 is configured to move the low flow plug 230 independently of the high flow valve plug 236.

Similarly, a high flow actuator 252 is operatively connected to the high flow valve plug 236, the high flow actuator 252 moving the high flow valve plug 236 relative to the valve seat 219 to control fluid flow through the valve seat 219. The high flow actuator 252 is configured to move the high flow valve plug 236 independently of the low flow valve plug 230.

The high flow/low flow valve 210 described above with respect to FIG. 3, may be used to control a wide range of fluid flow conditions through the valve body 212. For example, when only a relatively low flow rate is needed, and/or one which requires precise control, the low flow valve plug 230 and the low flow valve seat 221 are ideally suited for fluid control. Initially, the high flow valve plug 236 is positioned against from the valve seat 219. Thereafter, the low flow valve plug 230 may be moved relative to the low flow valve seat 221 to precisely control low levels of fluid flow through the opening 239 and thus through the hollow passageway 237. When downstream flow requirements require more flow than the maximum flow controllable by the low flow valve plug 230, the low flow valve plug 230 may be positioned in a fully open position. Once the low flow valve plug 230 is fully open, the high flow valve plug 236 may be moved relative to the valve seat 219 to increase overall fluid flow through the valve body 212 to greater than the maximum fluid flow controllable by the low flow valve plug 230 alone.

Although certain high flow/low flow valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A high flow/low flow valve comprising:
 a valve body having a fluid inlet and a fluid outlet connected to one another by a fluid passageway, the fluid passageway including a first branch and a second branch,
 a low flow valve seat disposed in the fluid passageway;
 a high flow valve seat disposed in the fluid passageway, separated from the low flow valve seat,
 a low flow valve plug disposed in the fluid passageway, the low flow valve plug cooperating with the low flow valve seat to control fluid flow through the low flow valve seat;
 a high flow valve plug disposed in the fluid passageway, the high flow valve plug cooperating with the high flow valve seat to control fluid flow through the high flow valve seat;
 a low flow actuator operatively connected to the low flow valve plug; and
 a high flow actuator operatively connected to the high flow valve plug; and
 wherein the low flow valve seat defines a low flow restriction and a maximum low flow port fluid flow, and the high flow valve seat defines a high flow restriction and a maximum high flow port fluid flow, and the maximum low flow port fluid flow is between 5% and 25% of the maximum high flow port fluid flow.

2. The high flow/low flow valve of claim 1, further comprising a high flow trim and a low flow trim.

3. The high flow/low flow valve of claim 2, wherein the high flow trim is a different type trim than the low flow trim.

4. The high flow/low flow valve of claim 3, wherein the high flow trim comprises a clamped cage.

5. The high flow/low flow valve of claim 3, wherein the low flow trim comprises one of a skirt guided plug or a clamped cage.

6. The high flow/low flow valve of claim 1, wherein the low flow valve plug is independently positionable relative to the high flow valve plug.

7. A high flow/low flow valve comprising:
 a valve body having a fluid inlet and a fluid outlet connected to one another by a fluid passageway,
 only a single valve seat fixedly disposed in the fluid passageway, the valve seat having a low flow side and a high flow side;
 a low flow valve plug disposed in the fluid passageway proximate the low flow side of the valve seat, the low flow valve plug cooperating with the valve seat to control fluid flow through the low flow side of the valve seat;

a high flow valve plug disposed in the fluid passageway proximate the high flow side of the valve seat, the high flow valve plug cooperating with the valve seat to control fluid flow through the high flow side of the valve seat;

a low flow actuator operatively connected to the low flow valve plug; and a high flow actuator operatively connected to the high flow valve plug.

8. The high flow/low flow valve of claim 7, further comprising a high flow trim and a low flow trim.

9. The high flow/low flow valve of claim 8, wherein the high flow trim is a different type trim than the low flow trim.

10. The high flow/low flow valve of claim 9, wherein the high flow trim comprises a clamped cage.

11. The high flow/low flow valve of claim 9, wherein the low flow trim comprises one of a skirt guided plug, or a clamped cage.

12. The high flow/low flow valve of claim 7, wherein the low flow valve plug is independently positionable relative to the high flow valve plug.

13. A high flow/low flow valve comprising:
a valve body having a fluid inlet and a fluid outlet connected to one another by a fluid passageway,
a valve seat disposed in the fluid passageway;
a low flow valve plug disposed in the fluid passageway proximate the valve seat, the low flow valve plug cooperating with the valve seat to control fluid flow through the valve seat;
a high flow valve plug disposed in the fluid passageway proximate the valve seat, the high flow valve plug cooperating with the valve seat to control fluid flow through the valve seat;
a low flow actuator operatively connected to the low flow valve plug; and
a high flow actuator operatively connected to the high flow valve plug; and
wherein the low flow valve seat defines a low flow restriction and a maximum low flow port fluid flow, and the high flow valve seat defines a high flow restriction and a maximum high flow port fluid flow, and the maximum low flow port fluid flow is between 5% and 25% of the maximum high flow port fluid flow.

14. A high flow/low flow valve comprising:
a valve body having a fluid inlet and a fluid outlet connected to one another by a fluid passageway,
a high flow valve seat disposed in the fluid passageway;
a high flow valve plug disposed in the fluid passageway proximate the high flow valve seat, the high flow valve plug cooperating with the high flow valve seat to control fluid flow through the high flow valve seat, the high flow valve plug including a hollow passageway that forms part of the fluid passageway, an opening of the hollow passageway of the high flow valve plug forming a low flow valve seat;
a low flow valve plug disposed in the fluid passageway proximate the low flow valve seat, the low flow valve plug cooperating with the low flow valve seat to control fluid flow through the hollow passageway;
a low flow actuator operatively connected to the low flow valve plug; and
a high flow actuator operatively connected to the high flow valve plug; and
wherein the low flow valve seat defines a low flow restriction and a maximum low flow port fluid flow, and the high flow valve seat defines a high flow restriction and a maximum high flow port fluid flow, and the maximum low flow port fluid flow is between 5% and 25%, of the maximum high flow port fluid flow.

15. The high flow/low flow valve of claim 14, further comprising a high flow trim and a low flow trim.

16. The high flow/low flow valve of claim 15, wherein the high flow trim is a different type trim than the low flow trim.

17. The high flow/low flow valve of claim 16, wherein the high flow trim comprises a clamped cage.

18. The high flow/low flow valve of claim 17, wherein the low flow trim comprises a skirt guided plug.

19. The high flow/low flow valve of claim 14, wherein the maximum low flow port fluid flow is between of the maximum high flow port fluid flow.

20. The high flow/low flow valve of claim 14, wherein the low flow valve plug is independently positionable relative to the high flow valve plug.

21. A method of operating a high flow/low flow valve, the method comprising:
positioning a high flow valve plug relative a high flow valve seat at about 15% of the fully open travel of the high flow valve plug;
moving a low flow valve plug relative to a low flow valve seat to control fluid flow through the low flow valve seat;
positioning the low flow valve plug to between 80% and 100% of the fully open position of the low flow valve plug to maximize fluid flow thorough the low flow valve seat; and
after positioning the low flow valve plug, moving the high flow valve plug relative to the high flow valve seat to increase overall fluid flow through the valve to greater than the maximum fluid flow through the low flow valve seat.

22. A method of operating a high flow/low flow valve, the method comprising:
positioning a high flow valve plug relative to a high flow side of a valve seat to produce a fluid flow through the valve seat that is equal to 80% or greater of a maximum fluid flow through a low flow side of the valve seat when a low flow valve plug is in a fully open position;
moving the low flow valve plug relative to the low flow side valve seat to control fluid flow through the valve seat;
positioning the low flow valve plug to 80% or greater of the fully open position to maximize fluid flow thorough the valve seat; and
after the low flow valve plug is positioned, moving the high flow valve plug relative to the high flow side of the valve seat to increase overall fluid flow through the valve seat to greater than the maximum fluid flow through the low flow side of the valve seat when the low flow valve plug is in the fully open position.

* * * * *

UNITED STATES PATENT AND TRADEMARK OFFICE
CERTIFICATE OF CORRECTION

Page 1 of 2

PATENT NO. : 12,044,319 B2
APPLICATION NO. : 17/527392
DATED : July 23, 2024
INVENTOR(S) : Shannon E. Jelken et al.

It is certified that error appears in the above-identified patent and that said Letters Patent is hereby corrected as shown below:

In the Specification

At Column 2, Line 41, "relative a" should be -- relative to a --.

At Column 2, Line 47, "thorough" should be -- through --.

At Column 2, Line 61, "thorough" should be -- through --.

At Column 3, Line 8, "type trim" should be -- type of trim --.

At Column 5, Line 3, "thorough" should be -- through --.

At Column 5, Line 37, "that" should be -- than --.

At Column 6, Line 49, "thorough" should be -- through --.

At Column 6, Line 60, "that" should be -- than --.

At Column 7, Line 63, "against from the" should be -- against the --.

In the Claims

At Column 8, Line 26, "branch," should be -- branch; --.

At Column 8, Line 29, "seat," should be -- seat; --.

At Column 8, Line 62, "passageway," should be -- passageway; --.

Signed and Sealed this
Twenty-third Day of December, 2025

John A. Squires
*Director of the United States Patent and Trademark Office*

At Column 9, Line 27, "passageway," should be -- passageway; --.

At Column 9, Line 49, "passageway," should be -- passageway; --.

At Column 10, Line 21, "between of" should be -- between --.

At Column 10, Line 28, "relative a" should be -- relative to a --.

At Column 10, Line 36, "thorough" should be -- through --.

At Column 10, Line 54, "thorough" should be -- through --.